United States Patent
Yolleck et al.

(10) Patent No.: US 7,523,409 B2
(45) Date of Patent: Apr. 21, 2009

(54) METHODS AND SYSTEMS FOR OPERATING MULTIPLE WEB PAGES IN A SINGLE WINDOW

(75) Inventors: Stephen Mark Yolleck, Sunnyvale, CA (US); Marek Gorecki, Palo Alto, CA (US); Denise Ho, Los Altos, CA (US)

(73) Assignee: Microsoft Corporation, Redmond, WA (US)

( * ) Notice: Subject to any disclaimer, the term of this patent is extended or adjusted under 35 U.S.C. 154(b) by 527 days.

(21) Appl. No.: 11/135,993

(22) Filed: May 24, 2005

(65) Prior Publication Data

US 2006/0271858 A1  Nov. 30, 2006

(51) Int. Cl.
*G06F 3/048* (2006.01)
(52) U.S. Cl. ........................ 715/777; 715/781
(58) Field of Classification Search ............. 715/777, 715/781
See application file for complete search history.

(56) References Cited

U.S. PATENT DOCUMENTS

| | | | | |
|---|---|---|---|---|
| 5,668,964 A | * | 9/1997 | Helsel et al. ............... 715/776 |
| 6,049,812 A | * | 4/2000 | Bertram et al. ............. 715/516 |
| 6,489,975 B1 | * | 12/2002 | Patil et al. .................... 715/781 |
| 6,801,227 B2 | * | 10/2004 | Bocionek et al. ............ 715/777 |
| 2004/0093562 A1 | * | 5/2004 | Diorio et al. ................ 715/513 |
| 2006/0155728 A1 | * | 7/2006 | Bosarge ...................... 707/100 |
| 2006/0168054 A1 | * | 7/2006 | Burkhart et al. ............. 709/206 |

OTHER PUBLICATIONS

Avant Browser features and reviews, pp. 1-7, dates ranges from Feb. 2, 2004-May 20, 2004.*
Mozilla Tabbed Browsing, pp. 1-3; dated Oct. 14, 2004.*
Tim Tibbetts, published article, "Avant Browser 8.02 Build", Jan. 19, 2004, p. 1-3.*

* cited by examiner

*Primary Examiner*—Weilun Lo
*Assistant Examiner*—Tuyetlien T Tran
(74) *Attorney, Agent, or Firm*—Shook, Hardy & Bacon LLP

(57) ABSTRACT

Methods and systems for operating multiple web pages in a single browser window. The methods and systems include providing tabbed browsing whereby a user may select a tab to open a web page associated to it. A set of tabs and buttons are located on a tab band within the browser window. The functionality of tabbed browsing is compatible with existing browser features and applications. The computer software for tabbed browsing is created as a plug-in to the browser.

10 Claims, 6 Drawing Sheets

METHODS AND SYSTEMS FOR OPERATING MULTIPLE WEB PAGES IN A SINGLE WINDOW

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The present invention relates to the field of computer software. More particularly, the present invention relates to web browsers and software add-ons to web browsers.

BACKGROUND OF THE INVENTION

Today, there are several web browsers for a user to operate when accessing the Internet. These web browsers vary greatly with feature richness and functionality. Because of the variety, software manufacturers and developers understand that web browsers may determine the user's experience during operation. Therefore, software manufacturers and developers are becoming more sensitive to enhancing the user's experience in using a particular web browser.

Web browsers may be categorized into two categories, open-source web browsers and closed-source web browsers. The difference between the two browsers is that an open-source web browser has its computer source code available to the public, such as to independent software developers or third-party vendors (ISVs), while a closed-source web browser does not have its computer source code available to the public. With the open-source web browser, the public may review the computer source code, make modifications of the computer source code with the owner's approval, or create third-party computer software based on the computer source code that has been reviewed. The third-party computer software may be built with a knowledge and understanding of the computer source code of the open-source web browser. This may result in a reduced amount of software testing to ensure the functionality and integration of the third-party computer software with the open-source web browser.

As stated earlier, computer source code of the closed-source web browser is not opened to the public. The owner of the closed-source web browser has control over the modification of the computer source code. In this situation, ISVs may not review, access, nor modify the computer source code. ISVs may find it difficult to create third-party computer software, although they are allowed to create such software that works with the closed-source web browser. Usually, the resulting third-party computer software is referred to as add-on software. Because add-on software is created independently of the computer source code, more software testing may be desired to test the functionality between the add-on software and the closed-source web browser. Software testing may be more involved and rigorous to ensure the functionality and integration of the add-on software and the closed-source web browser.

Along with the evolution of web browsers, there has been an increase in software enhancements to web browsers. One of those software enhancements has been tabbed browsing. Tabbed browsing allows a user to have multiple browser views existing in one browser window. In the past, a user had to open a separate window to access a web page. Opening multiple web pages would require opening multiple windows. With tabbed browsing, multiple web pages may be opened inside of one window. The multiple web pages are identified by tabs that may be individually selected to access a particular web page.

In the prior art, two approaches have appeared in the creation of tabbed browsing. One approach involves creating tabbed browsing for the open-source web browser. The tabbed browsing functionality may be created by modifying the computer source code of the open-source web browser. The tabbed browsing functionality is integrated into the computer source code of the open-source web browser. With this approach, the tabbed browsing functionality may be built by anyone. A downside to this approach is that the tabbed browsing functionality may not readily be separated from the computer source code of the open-source browser, especially if a problem occurs during operation.

Another approach involves creating tabbed browsing for the closed-source web browser providing tabbed browsing functionality via a toolbar that appears above an open frame in the closed-source web browser. The open frame contains visual information encountered from operating the web browser. The open frame and toolbar give the appearance of tabbed browsing. However, the tabbed browsing functionality is not fully compatible nor functional with existing applications operating with the closed-source web browser. Existing applications that may not work with tabbed browsing in this approach include browser features such as menus, status bars, toolbars, and browser helper objects (BHOs). A BHO is a computer software program that operates with the web browser. An example of a BHO is a toolbar accessory. As such, tabbed browsing may not operate with full integration and compatibility with the closed-source web browser. One reason for the limitation may be the lack of access that ISVs have to the computer source code of the closed-source web browser.

Recognizing the state of the prior art, a solution is needed to overcome the limitations of the approaches identified above. Specifically, there is a need for a fully integrated tab browsing solution for closed-source web browsers to provide application compatibility. There is also a need for an add-on software that may operate with both the open-source web browser and closed-source web browser. It would operate with the open-source web browser but allow for removal of the software if a problem arose between the add-on software and the open-source web browser. This could minimize the risk of corruption to the computer source code of the open-source web browser if a removal was needed. The same add-on software would be fully compatible with the existing features and operating capabilities of both the open-source web browser and the closed-source web browser.

SUMMARY OF THE INVENTION

The present invention generally relates to methods and systems for operating multiple web pages in a single browser window. The present invention uses computer hardware and software, web browsers, operating systems, and internet connections to provide tabbed browsing in a web browser. Computer software is created and executed as a plug-in to the web browser to provide the tabbed browsing functionality in the web browser. The same computer software provides functionality that is compatible with existing features in the web browser.

In accordance with the present invention, a method for implementing tabbed browsing in an existing web browser is provided that includes providing computer programs having tabbed browsing functionality when operating in conjunction with the existing browser at a computing device. The computer programs are registered as plug-ins with the existing browser. Browser instances are created for web pages respectively identified by tabs on a tab band while operating the computer programs with the existing browser to provide tabbed browsing functionality. Application compatibility is provided between the browsing instances and existing features associated with the existing browser.

In another aspect, a method for operating multiple web pages in a single window is provided that includes providing computer applications to augment an existing browser at a computing device. The computer applications are executed with the existing browser to provide tabbed browsing. Tabbed browsing is operated in conjunction with existing features functioning with the existing browser wherein tabbed browsing and the existing features are compatible and function together.

In yet another aspect, one or more computer-readable media having instructions stored thereon for implementing tabbed browsing in an existing web browser is provided that includes an existing web browser operating with add-on software. The add-on software operates with one or more browser interface components, one or more tab bar components, and a tab manager component. The one or more browser interface components operate to control respectively one or more browser instances, each browser instance associated with a tab in a tab bar. The one or more tab bar components operate to manage respectively one or more tab bars. The tab manager component operable to control the one or more browser interface components and the one or more tab bar components.

BRIEF DESCRIPTION OF THE SEVERAL VIEWS OF THE DRAWINGS

The present invention is described in detail below with reference to the attached drawing figures, wherein.

DETAILED DESCRIPTION OF THE INVENTION

The present invention will be better understood from the detailed description provided below and from the accompanying drawings of various embodiments of the invention, which describe, for example, methods and systems for operating multiple web pages in a single window. The detailed description and drawings, however, should not be read to limit the invention to the specific embodiments. Rather, these specifics are provided for explanatory purposes that help the invention to be better understood.

The present invention provides tabbed browsing whereby a user may select a tab to open a web page associated to it. A set of tabs and buttons are located on a tab band within the browser window. The functionality of tabbed browsing is compatible with existing browser features and applications. The computer software for tabbed browsing is created as a plug-in to the browser.

Having briefly described an overview of the present invention, an exemplary operating environment for the present invention is described below.

Exemplary Operating Environment

Figure 1:
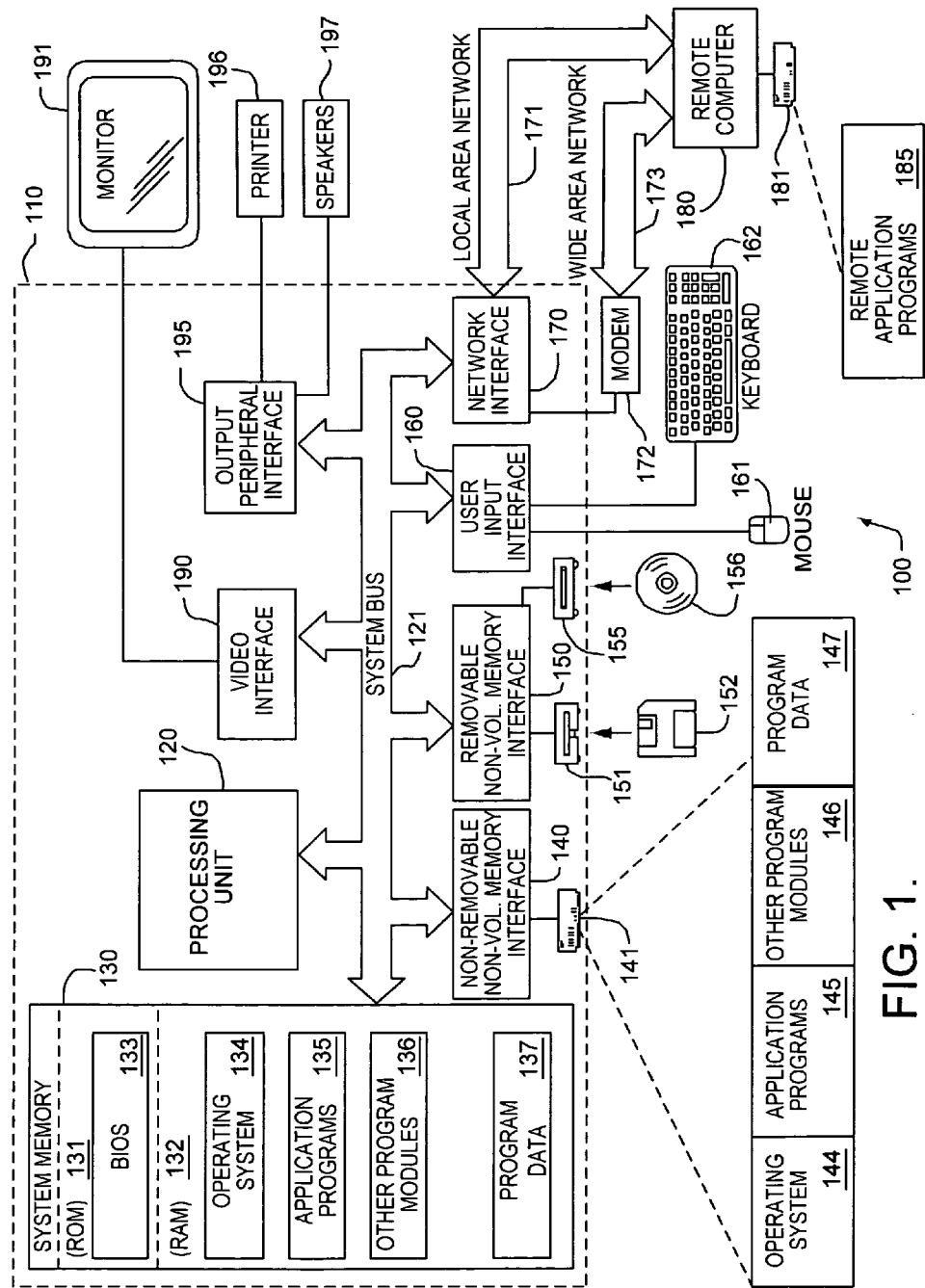
FIG. 1 is a block diagram of a computing system environment suitable for use in implementing the present invention.

Referring to the drawings in general and initially to FIG. 1 in particular, wherein like reference numerals identify like components in the various figures, an exemplary operating environment for implementing the present invention is shown and designated generally as computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the present invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system (BIOS) 133, containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks (DVDs), digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other programs 146 and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the internet. The modem 172, which may be internal or external, may be connected to the system bus 121 via the network interface 170, or other appropriate mechanism. In a networked environment, program modules depicted relative to the computer 110, or portions thereof, may be stored in a remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

When the computer 110 is turned on or reset, the BIOS 133, which is stored in the ROM 131, instructs the processing unit 120 to load the operating system, or necessary portion thereof, from the hard disk drive 141 into the RAM 132. Once the copied portion of the operating system, designated as operating system 144, is loaded in RAM 132, the processing unit 120 executes the operating system code and causes the visual elements associated with the user interface of the operating system 134 to be displayed on the monitor 191. Typically, when an application program 145 is opened by a user, the program code and relevant data are read from the hard disk drive 141 and the necessary portions are copied into RAM 132, the copied portion represented herein by reference numeral 135.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between the various steps herein disclosed unless and except when the order of individual steps is explicitly described.

Tabbed Browsing

The present invention may be implemented using an open-source web browser or a closed-source web browser. Software may be created in a number of ways to work with either browser to implement the present invention. More specifically, the present invention discusses implementations of an embodiment whereby software is created without requiring access to the source code of the web browser to implement tabbed browsing. The software may be created to function as a plug-in to the browser.

Figure 2A:
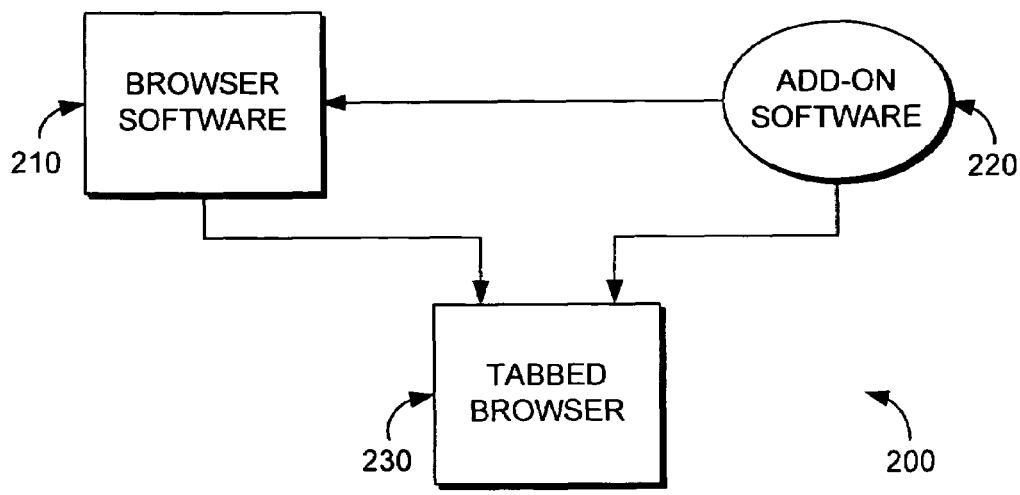
FIGS. 2A and 2B are block diagrams of a software environment suitable for practicing an embodiment of the present invention.

In FIG. 2A, a block diagram is shown illustrating a browser software 210, an add-on software 220, and a tabbed browser 230. The present illustration shows an embodiment whereby add-on software 220 may be created without requiring access to the source code of browser software 210. The combination of browser software 210 and add-on software 220 results in tabbed browser 230. Add-on software 220 operates by registering as a plug-in with browser software 210. During this registration process, browser software 210 recognizes add-on software 220 and may allow add-on software 220 to manipulate software in browser software 210 to provide additional features in the web browser, namely tabbed browsing.

The terms add-on, extension, and plug-in software may be used in this document interchangeably. These terms refer to software that is either added to existing software, compiled with existing software, or executed with existing software to augment the existing software or to operate currently with the existing software to provide a feature enhancement.

Figure 2B:
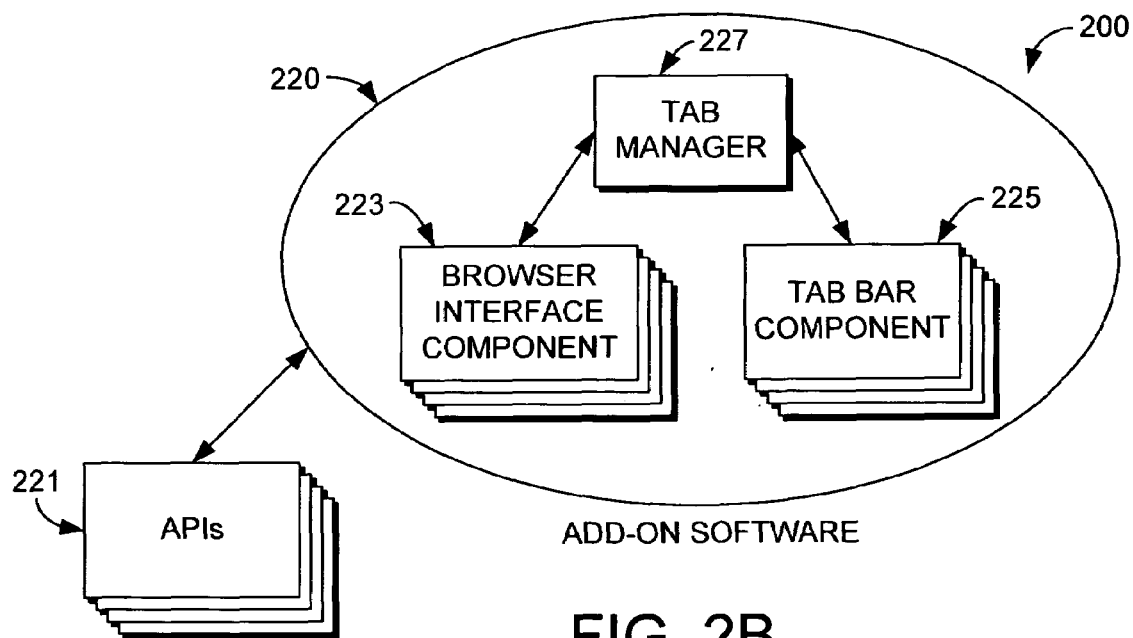

In order to configure tabbed browser 230 from the combination of browser software 210 and add-on software 220, add-on software 220 may use a set of application programming interfaces (APIs) 221 as shown in FIG. 2B to interface with a web browser at browser software 210. Add-on software 220 may contain a browser interface component 223, a tab bar component 225, and a tab manager 227.

Add-on software 220 may contain one or more browser interface components 223. Each browser interface component 223 controls a browser instance that exists in a browser window. A browser instance looks like a browser window but contains a corresponding tab located on a tab bar. The number of browser instances opened in one browser window may be identified by the number of tabs located in the tab bar.

Add-on software 220 may contain one or more tab bar components 225. Tab bar component 225 manages the tab bar that appears in the web browser. Tab bar component 225 may control user-selectable buttons and the tabs that may appear on the tab bar. This control may include the size and shape of the buttons and tabs as well as the location of the buttons and tabs on the tab bar.

Tab manager 227 exists to control a set of browser interface components 223 and a set of tab bar components 225 that may exist in add-on software 220. Tab manager 227 controls which browser interface component 223 and tab bar component 225 is associated with a particular browser window. For example, a user may have two browser windows open with five browser instances opened in the first browser window and three browser instances opened in the second browser window. Add-on software 220 would operate to contain eight browser interface components 223 along with two tab bar components 225 and one tab manager 227. Five of the eight browser interface components 223 and one tab bar component 225 would be associated to the first browser window while three of the remaining eight browser interface components 223 and the other tab bar component 225 would be associated to the second browser window. Tab manager 227 would manage the various software components keeping them associated to the correct browser windows.

APIs are computer software programs that operate to interface with other computer software programs or computer systems. APIs may be developed for various applications depending on the intent of the software developer. In FIG. 2B, APIs 221 may be used with other computer software to provide tabbed browsing functionality as described earlier. The APIs provide various interfaces to perform various functions, such as controlling a window handle, facilitating browser control, or controlling browser navigation. This list of functions for APIs is by no means limited to the ones described. Many different types of APIs may be used to implement an embodiment of the present invention. One may note that APIs may function at the operating system level as well as at the browser level.

Figure 3:
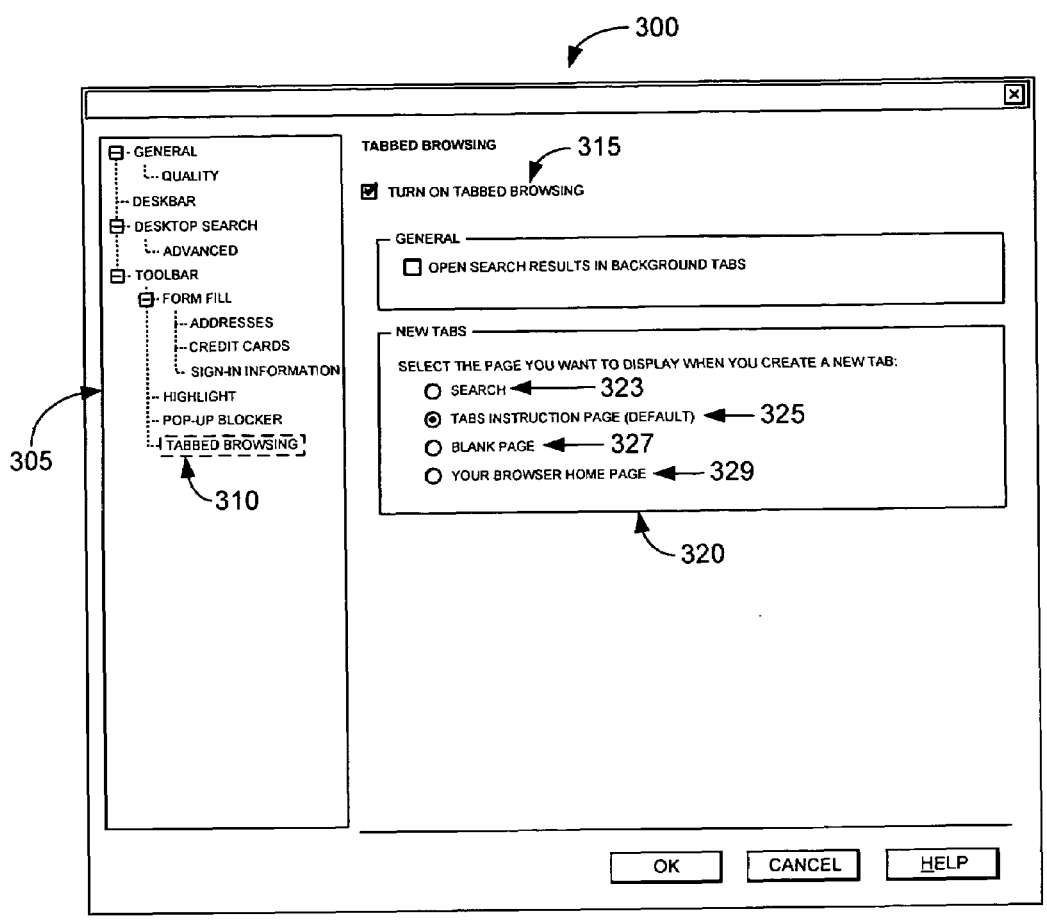
FIG. 3 is a block diagram of an exemplary operating environment illustrating an embodiment of the present invention.

Referring now to FIG. 3, a block diagram is shown illustrating an exemplary operating environment in a configuration page 300. Configuration page 300 illustrates information that may be provided when browser software 210 and add-on software 220 operates together. Configuration page 300 contains options for tabbed browsing with an outline window 305, a tabbed browsing entry 310, a tabbed browsing selection 315, and a new tabs window 320. New tabs window 320 contains a search selection 323, a tabs instruction page selection 325, a blank page selection 327, and a browser home page selection 329.

Configuration page 300 is merely exemplary for an implementation of an embodiment of the present invention. Configuration page 300 may be changed to show other information as desired by one implementing the present invention.

Outline window 305 contains an entry for tabbed browsing indicated by tabbed browsing entry 310. Tabbed browsing entry 310 may be selected with a pointing device, such as a mouse pointer, connected to a computing device to show information illustrated next to outline window 305. The information relates to tabbed browsing and provides various options that may be selected or modified related to tabbed browsing.

Tabbed browsing selection 315 provides a selectable box as an option to turn on or turn off tabbed browsing. New tabs window 320 provides various information related to tabs such as the initial display of web pages when a new tab is created. In new tabs window 320, a user has the option to select the initial web page to be created when a new tab is selected during the operation of tabbed browsing. The present invention illustrates four selections identified by search selection 323, tabs instruction page selection 325, blank page selection 327, and browser home page selection 329. However, other embodiments of the present invention may provide different selections in new tabs window 320.

Figure 4:
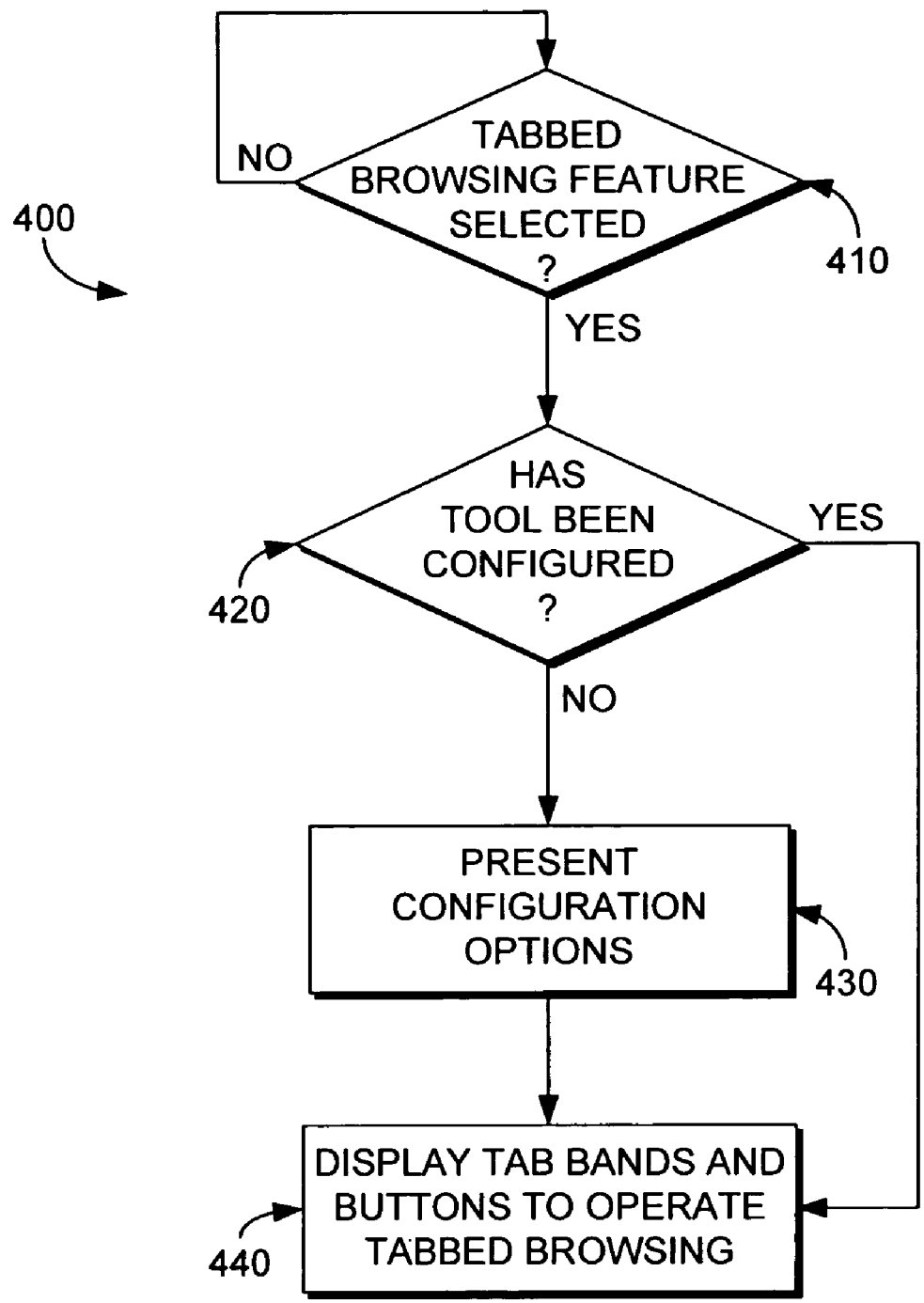
FIG. 4 is a flowchart illustrating an exemplary process for configuring tabbed browsing in accordance with an embodiment of the present invention.

Corresponding to FIG. 3 is a method 400 for configuring tabbed browsing illustrated in FIG. 4. This method assumes that a user is operating a computing device and a web browser that has installed add-on software 220 as a plug-in to get tabbed browser 230. The user may operate tabbed browsing by determining first if the tabbed browsing feature has been selected in a step 410. This step is similar to accessing configuration page 300 and selecting the box associated with tabbed browsing selection 315. Tabbed browsing may need to be configured as stated in a step 420. If tabbed browsing is not configured, configuration options may be presented in a step 430. A user may configure tabbed browsing as illustrated in new tabs window 320. If tabbed browsing has been configured, tabs and buttons may be shown in a tab band in a browser window in a step 440.

Figure 5A:
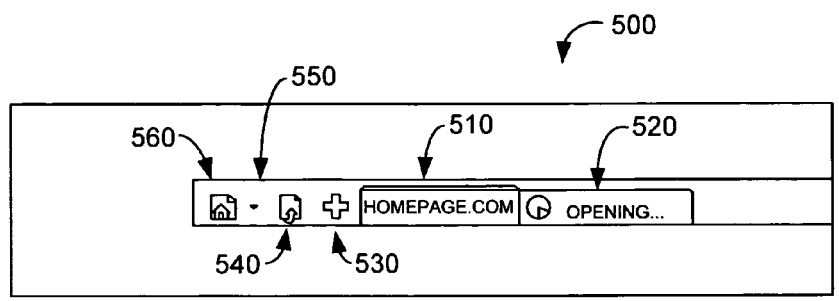
FIGS. 5A and 5B are block diagrams of exemplary tab bands illustrating an embodiment of the present invention.
Figure 5B:
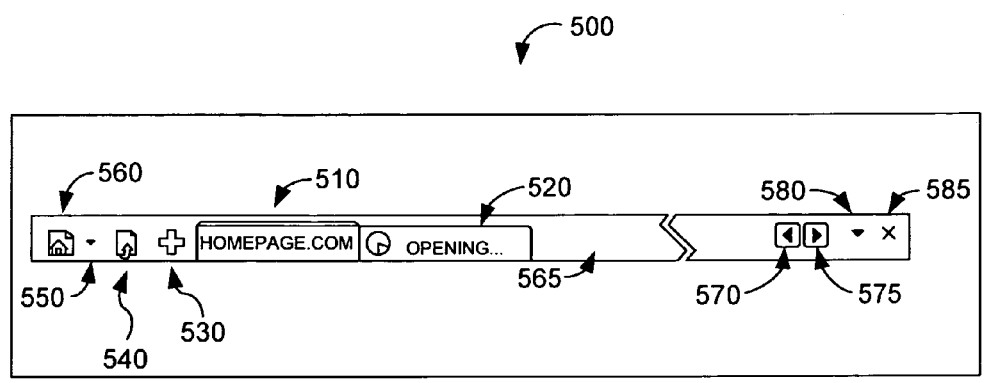

Once a user has selected the options that are desired to operate tabbed browsing, the user may see a tab band 500 as illustrated in FIGS. 5A and 5B. FIGS. 5A and 5B show an exemplary illustration of a tab band that appears when tabbed browsing is activated. FIG. 5A contains a foreground tab 510, a background tab 520, a new tab button 530, a quick tab button 540, a first menu 550, and a my routine button 560. The tabs and buttons shown in tab band 500 are exemplary for implementing an embodiment of the present invention and are not meant to be the only tabs and buttons that may be implemented with the present invention. Other embodiments of the present invention may implement a different setup than the one shown, and may implement different tabs and buttons from the ones shown. Furthermore, tab band 500 contains dynamic information that may change during the operation of tabbed browsing. The number of tabs, the headings in the tabs, and the size of the tabs may change depending on the number of web pages that are opened.

In FIG. 5A, foreground tab 510 shows a tab for an exemplary web page identified as homepage.com. Foreground tab 510 corresponds to a web page being viewed by a user. Foreground tab 510 shows an active tab which is slightly more prominent in appearance in the list of tabs on tab band 500 than the other tabs. Foreground tab 510 changes position on tab band 500 whenever a user selects a different tab to view the corresponding web page. Whenever a subsequent tab is selected, that tab becomes foreground tab 510 with its corresponding web page being shown and the previous tab becomes background tab 520. Typically, there is usually one foreground tab 510 as illustrated in FIGS. 5A and 5B. However, it is possible to implement other embodiments of the present invention to contain more than one foreground tab 510.

Background tab 520 corresponds to the tabs on tab band 500 that are not foreground tab 510. Background tab 520 may vary in number and are less prominent in appearance in the list of tabs on tab band 500 than foreground tab 510. Like foreground tab 510, background tab 520 corresponds to a web page. However, the web page is not currently being viewed by the user. If the user selects background tab 520, the tab becomes foreground tab 510 and the previous foreground tab 510 becomes background tab 520.

A user may desire to create new tabs on tab band 500. The user may select new tab button 530 to create a tab on tab band 500 along with an associated web page. The type of web page that may open when new tab button 530 is selected depends on the configuration options that may have been selected in new tabs window 320 in FIG. 3. The user may create new tabs with new tab button 530 as desired.

A user may desire to use quick tab button 540 to create new tabs and open new web pages whenever a hyperlink is selected on the currently active web page. Quick tab button 540 may be selected and may remain in a slightly depressed position in appearance to show that it is activated. When this happens, a selection of a hyperlink on a web page may cause a new tab to appear on tab band 500 with a new web page containing the information associated with the hyperlink. Correspondingly, a subsequent selection of quick tab button 540 after it has first been selected may cause quick tab button 540 to become deactivated. When this happens, quick tab button 540 may raise in appearance to its former position as a button on tab band 500. This appearance may alert a user that the feature is deactivated.

In FIG. 5B, the same tab band 500 is shown with an extended view of information that may be provided on the right side of tab band 500. In FIG. 5B, a scroll left button 570, a scroll right button 575, a second menu 580, and a close button 585 are shown. These are some examples of the buttons that may be implemented with the present invention to provide functionality that may be desired. As stated earlier, other buttons, menus, and tabs may be provided to implement other embodiments of the present invention. One skilled in the art may change the operations of the buttons and tabs to suit particular needs.

Figure 6:
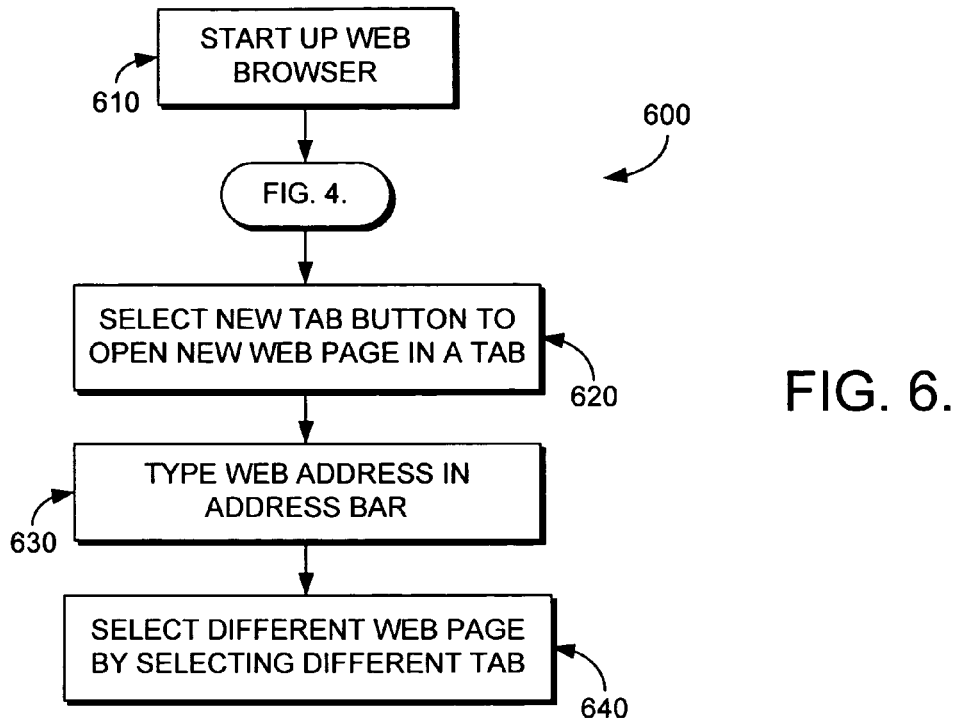
FIG. 6 is a flowchart illustrating an exemplary process for operating tabbed browsing in accordance with an embodiment of the present invention.
Figure 7:
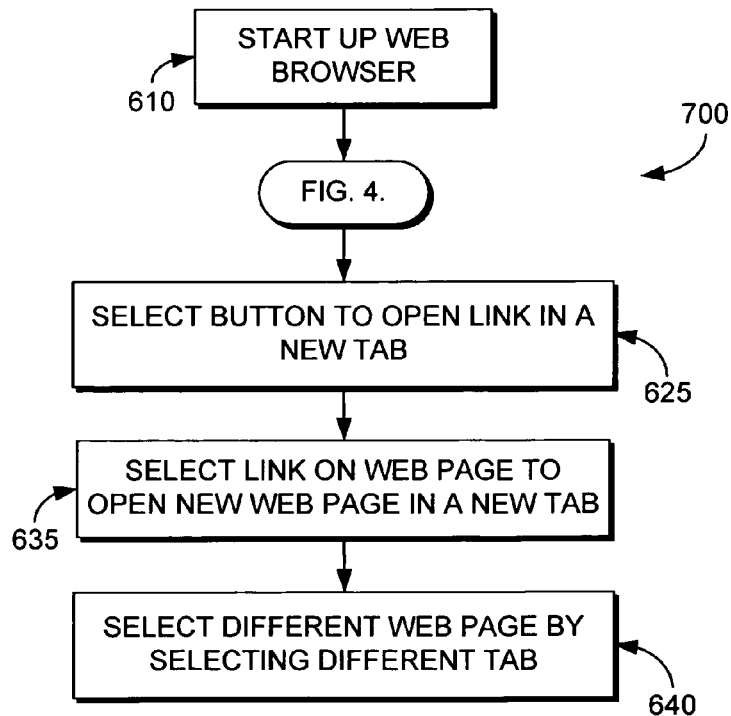
FIG. 7 is a flowchart illustrating an exemplary process for operating tabbed browsing in accordance with an embodiment of the present invention.

Now turning to FIGS. 6 and 7, methods 600 and 700 are shown for operating tabbed browsing. In FIGS. 6 and 7, a web browser is opened at a computing device as shown in a step 610. Then, a determination is made whether tabbed browsing has been activated as shown by the icon containing FIG. 4. FIG. 4 was discussed earlier as the process for activating and configuring tabbed browsing.

In FIG. 6, a step 620 illustrates selecting new tab button to open a new web page in a tab. This corresponds to new tab button 530 discussed in FIGS. 5A and 5B. The new web page may appear in accordance with the option selected in new tabs window 320 in FIG. 3 discussed earlier. After the new web page appears, a user may type a desired web address in the address bar as shown in a step 630.

In FIG. 7, a step 625 illustrates selecting a button to open a link in a new tab. This corresponds to quick tab button 540 also discussed in FIGS. 5A and 5B. A user may select a link (also described earlier as a hyperlink) on the active web page to open a new web page in a new tab in a step 635. Although not described in FIG. 7 but discussed earlier, the same button selected in step 625 to activate the feature of step 635 may be selected again to deactivate the feature. One ordinarily skilled in the art may note that there are other ways of opening a link in a new tab including right-clicking on a hyperlink using a pointer device to open a new tab, or holding down the Alt button on the keyboard of a computing device while clicking on a hyperlink using the pointer device.

In both FIGS. 6 and 7, a user may select different web pages by selecting different tabs in a step 640. The tabs may be selected with either a pointing device such as a mouse pointer or keystrokes on a keyboard connected to the computing device. As discussed throughout the figures, by selecting a tab, a web page appears in the browser window. If a different tab is selected, a different web page appears over the previous web page.

As noted above, the present invention may be implemented with either a closed-source web browser or an open-source web browser. Examples of commercially-available web browsers include the closed-source web browser known as INTERNET EXPLORER from the Microsoft Corporation of Redmond, Wash. and the open-source web browser known as MOZILLA FIREFOX of the Mozilla Foundation of Mountain View, Calif.

A scenario may be described using the closed-source web browser (browser software 210) known as INTERNET EXPLORER and tabbed browsing software (add-on software 220). Tabbed browsing software is executed to operate with the web browser as a plug-in called a browser helper object. While loaded, the tabbed browsing software receives browser events. A tab bar (tab band 500) is created and displayed above the browser window with a tab (foreground tab 510 and background tab 520) after tab browsing is configured (configuration page 300). The tab may show a user's home page or other web page.

As the user navigates, the tab title changes to the corresponding web page title. A right-mouse click on a tab may provide a web page navigation history for that particular tab. As the user requests new web pages (steps 620 or 635), tabbed browsing software may allow the creation of new tabs and web pages which may be called browser instances in the browser window. As stated earlier, a browser instance looks like a browser window but contains a corresponding tab located on the tab bar. Subsequent tabs are shown on the tab bar with previous tabs (FIGS. 5A and 5B). The number of browser instances opened in one browser window may be identified by the number of tabs located in the tab bar.

When a second browser instance is opened with a new tab, the previous first browser instance is hidden. The second browser instance is repositioned using the same coordinates as the now hidden first browser instance. As stated earlier, a new tab is added to the tab bar for a new browser instance. The tab bar is shown above the second browser instance maintaining visibility to the user. If the user clicks the first tab, the hidden first browser instance of the web browser reappears on top of the second browser instance which moves off the screen. The tab bar remains visible with the first browser instance.

Whenever the user accesses a tab, the corresponding browser instance operates with compatibility and functionality to existing features in the web browser. This means that toolbars, status bars, and menus are accessible with each browser instance in tabbed browsing. An additional functionality of tabbed browsing is that the user may de-activate tabbed browsing (configuration page 300) or remove the software completely (add-on software 220).

Several diagrams and process flowcharts have been discussed to explain the present invention. As mentioned earlier, the present invention may be implemented with both a open-source web browser and a closed-source web browser.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A computer-implemented method for implementing tabbed browsing in an existing web browser, comprising:
   at a computing device, providing one or more computer programs having tabbed browsing functionality when operating in conjunction with the existing web browser;
   registering the one or more computer programs as one or more plug-ins with the existing web browser, wherein the one or more plug-ins include one or more tab bar components and a tab manager;
   upon registration of the one or more computer programs, presenting a configuration page with options for tabbed browsing, wherein the configuration rage further comprises at least one user-selectable button that allows a user to turn tab browsing on and off;
   creating one or more browser instances for one or more web pages respectively identified by one or more tabs on a tab band while operating the one or more computer programs with the existing web browser to provide tabbed browsing functionality;
   providing a plurality of user-selectable buttons on the tab band, wherein the plurality of user-selectable buttons comprise a new tab and at least one of: quick tab, first menu, second menu, my routine, scroll left, scroll right, and close;
   providing a tab history function, that a user may activate by interacting with the tab; and
   providing application compatibility between the one or more browsing instances and existing features associated with the existing web browser.

2. The computer-implemented method of claim 1 wherein creating one or more browser instances comprises opening one or more browser frames containing browser features for each frame and loading associated browser plug-ins and toolbars for each frame.

3. The computer-implemented method of claim 2, wherein the existing web browser is a closed-source browser.

4. A computer system having a processor, a memory and an operating environment, the memory having stored therein computer-executable instructions, that when executed by the processor, performs the method as recited in claim 1.

5. One or more computer storage media having instructions stored thereon for performing the method of claim 1.

6. A computer-implemented method for operating multiple web pages in a single window, comprising:
   at a computing device, providing a set of computer applications to augment an existing web browser, wherein the set of computer applications comprises an add-on computer software to function as a plug-in to the existing web browser and uses a set of Application Programming Interfaces (APIs);
   presenting a configuration page with options for tabbed browsing, wherein the configuration page further comprises at least one user-selectable button that allows a user to turn tab browsing on and off;
   executing the set of computer applications with the existing web browser to provide tabbed browsing, wherein providing tabbed browsing comprises operating a tab band visible in the existing web browser with one or more tabs and a plurality of user-selectable buttons, and wherein the plurality of user-selectable buttons comprise a new tab and at least one of: quick tab, first menu, second menu, my routine, scroll left, scroll right, and close;
   providing a tab history function, that a user may activate by interacting with the tab;
   upon execution of the set of computer applications, presenting a configuration page with options for tabbed browsing in an outline window;
   loading associated browser plug-ins and toolbars for one or more browser instances; and
   operating tabbed browsing in conjunction with existing features functioning with the existing web browser wherein tabbed browsing and the existing features are compatible and function together.

7. The computer-implemented method of claim 6, wherein the existing web browser is a closed-source browser.

8. A computer system having a processor, a memory and an operating environment, the memory having stored therein computer-executable instructions, that when executed by the processor, performs the method as recited in claim 6.

9. One or more computer storage media having instructions stored thereon for performing the method of claim 6.

10. One or more computer storage media having instructions stored thereon for facilitating tabbed browsing with an existing web browser, comprising:
- a configuration page operable to present tabbed browsing options that is automatically displayed when a user turns tabbed browsing on and tabbed browsing has not been previously configured, wherein the configuration page further comprises at least one user-selectable button that allows a user to turn tab browsing on and off;
- one or more browser interface components, associated with a browser window and operable to control respectively one or more browser instances, each browser instance associated with a tab in a tab bar and loading associated browser plug-ins and toolbars;
- one or more tab bar components operable to manage respectively one or more tab bars, wherein each tab bar component is associated with each browser window;
- a tab manager component operable to control the one or more browser interface components and the one or more tab bar components;
- a tab band visible in the existing web browser with one or more tabs and a plurality of user-selectable buttons on the tab band, wherein the plurality of user-selectable buttons comprise a new tab and at least one of: quick tab, first menu, second menu, my routine, scroll left, scroll right, and close;
- a tab history function, that a user may activate by interacting with the tab; and
- wherein the instructions are located in an add-on software that uses a set of Application Programming Interfaces.

* * * * *